(12) United States Patent
Freisthler

(10) Patent No.: US 6,749,677 B2
(45) Date of Patent: Jun. 15, 2004

(54) ASPHALT SEALER COMPOSITION

(76) Inventor: Michael Freisthler, 501 Karen, Sidney, OH (US) 45365

( * ) Notice: Subject to any disclaimer, the term of this patent is extended or adjusted under 35 U.S.C. 154(b) by 16 days.

(21) Appl. No.: 10/298,854

(22) Filed: Nov. 18, 2002

(65) Prior Publication Data

US 2004/0025745 A1 Feb. 12, 2004

Related U.S. Application Data

(60) Provisional application No. 60/401,713, filed on Aug. 7, 2002.

(51) Int. Cl.$^7$ .......................... C09D 191/00; E01C 7/35; B05D 1/00; B05D 3/00
(52) U.S. Cl. ........................ 106/244; 106/248; 106/504; 427/138
(58) Field of Search ................................ 106/244, 248, 106/524; 427/138

(56) References Cited

U.S. PATENT DOCUMENTS

| | | | |
|---|---|---|---|
| 3,221,615 A | 12/1965 | McGovern | |
| 3,261,269 A | 7/1966 | McGovern | |
| 4,597,799 A | 7/1986 | Schilling | |
| 4,661,378 A | 4/1987 | McGovern | |
| 5,164,002 A | * 11/1992 | Ballenger et al. | ........... 106/267 |
| 5,741,502 A | 4/1998 | Roberts | |
| 5,762,699 A | 6/1998 | McGovern | |
| 6,086,853 A | 7/2000 | Michaels | |
| 6,156,833 A | 12/2000 | Rauls | |
| 6,306,184 B2 | 10/2001 | Ahmed | |
| RE37,629 E | 4/2002 | Wilkins, Jr. | |
| 6,406,673 B1 | 6/2002 | Soller et al. | |

* cited by examiner

*Primary Examiner*—David Brunsman
(74) *Attorney, Agent, or Firm*—Emch, Schaffer, Schaub & Porcello Co., L.P.A.

(57) ABSTRACT

This agricultural sealant relates to rejuvenating, sealing, and preserving asphalt pavements and concrete surfaces. More specifically, the sealant composition includes soy products and other vegetable products. More specifically, the agricultural sealant composition is a combination of soybean oil, alkyl esters of soybean oil, and at least one of d-limonene or other terpine hydrocarbons.

16 Claims, No Drawings

ASPHALT SEALER COMPOSITION

This application claims the benefit of provisional application Serial No. 60/401,713 filed Aug. 7, 2002.

TECHNICAL FIELD

This invention relates to rejuvenating, sealing, and preserving asphalt pavements and concrete surfaces with an agricultural product. More specifically, this invention relates to a composition comprising soy products and other vegetable products.

BACKGROUND OF THE INVENTION

Asphalt pavements are at their optimum performance shortly after they are properly designed, placed, compacted, and have cooled to ambient temperatures. From this point of time, they begin to oxidize from environmental elements. Two of the primary causes are water and ultraviolet light. This oxidation process causes pavements to become brittle and harden, resulting in cracking and raveling in just a few short years after placement. This is evidenced by the result of penetration and viscosity tests of asphalt cements before they are introduced to the manufacturing process versus test results after the mixing process is complete. And again, two to three years after their service life has began.

In recent years, highway agencies have recognized the necessity and benefits of early low cost treatments to asphalt pavements that will slow down this oxidation process. These early proactive treatments will become a necessity versus the current reactive maintenance and reconstructive practices we currently practice. This philosophy of early proactive treatments is just now becoming a part of the highway policy as we realize that our infrastructure is depreciating at a faster rate than it can be funded. Thus arises the need to economically as well as environmentally prolong new pavements in their new condition for a longer period of time, rather than letting them quickly deteriorate in five or six years and then trying to repair the damage that has occurred through natural oxidation.

Coal tar liquids, asphalt emulsion chip seals/slurry seals, and crack fillers, are a few of the maintenance processes placed on asphalt pavement as the signs of oxidation begin showing up and it is realized that something must be done.

BRIEF SUMMARY OF THE INVENTION

This agricultural sealant for preserving asphalt is a combination of soybean oil, alkyl esters of soybean oil, and at least one of d-limonene or other terpine hydrocarbons. preferably, the agricultural sealant composition is a combination of:

| Component | Weight Percent |
| --- | --- |
| soybean oil | 20.0 to 80.0 |
| alkyl esters of soybean oil | 10.0 to 60.0 |
| d-limonene | 10.0 to 40.0 |
| other terpine hydrocarbons | 0 to 40.0 |

The non aqueous composition is diluted with water as desired.

Deterioration of the pavement starts at the surface where water and ultraviolet light come into greatest contact with the pavement. Through the application of this product, a very oxidation-resistant material penetrates into the top 3/8 inch of pavement and allows a protective barrier from the elements. This invention is a liquid applied at ambient temperatures (60°–120° F.), which penetrates into the surface of the asphalt pavement quickly.

The agricultural sealant should be applied at a rate of 0.03 to 0.15 gallon per square yard. Rates below 0.03 will not provide an adequate seal, depending on the pavement's mix composition. Rates above 0.15 may create an unstable pavement. Standard asphalt distributors should be used for application where a precise rate of application can be achieved. Computer-controlled machines with nozzles designed for fog seals of comparable rates would be the preferred device for application of this agricultural sealant. Methods of handling this material should be comparable to other sealants. Care should be taken with regard to any contamination with water or any other liquid to ensure the quality of the process.

DETAILED DESCRITPION OF THE INVENTION preferably, my agricultural sealant composition is a combination of

| Component | Weight Percent |
| --- | --- |
| soybean oil | 20.0 to 60.0 |
| alkyl esters of soybean oil | 20.0 to 60.0 |
| d-limonene | 10.0 to 20.0 |
| other terpine hydrocarbons | 0 to 40.0 |

In another preferred embodiment, the composition is

| Component | Weight Percent |
| --- | --- |
| soybean oil | 20.0 to 60.0 |
| alkyl esters of soybean oil | 20.0 to 60.0 |
| d-limonene | 10.0 to 20.0 |
| other terpine hydrocarbons | 0 to 20.0 |

Still another preferred embodiment is

| Component | Weight Percent |
| --- | --- |
| soybean oil | 20.0 to 40.0 |
| alkyl esters of soybean oil | 40.0 to 60.0 |
| d-limonene | 0 to 20.0 |
| other terpine hydrocarbons | 10.0 to 20.0 |

Still another preferred embodiment is

| Component | Weight Percent |
| --- | --- |
| soybean oil | 20.0 to 40.0 |
| alkyl esters of soybean oil | 40.0 to 60.0 |
| d-limonene | 10.0 to 20.0 |
| other terpine hydrocarbons | 10.0 to 20.0 |

The components of the sealant may vary widely.

Soybean oil or soy oil is a most widely used vegetable oil for both edible and industrial uses.

The most common ester of soybean oil is the methyl ester.

Terpenes are widely distributed in nature and are present in nearly all living plants. It is generally recognized that the term "terpene" not only applies to isoprene olligomers, but also to their saturated or partially saturated isomers as well as to the derivatives, which are referred to as terpenoids, such as, for example, alcohols, aldehydes, esters, and the like. Terpenes have been widely used as flavor and perfume materials. Common monoterpenes include turpentine and limonene.

The preferred terpene is limonene which is a naturally occurring chemical found in high concentrations in citrus fruits and spices.

While d-limonene is the more preferred isomer, 1-limonene may also be used in the present invention, 1-limonene also is found in naturally occurring substances such as pine-needle oil, oil of fir, spearmint, and peppermint, for example. Limonene is commercially available from Florida Chemical Company, Inc., for example, in three different grades, namely untreated/technical grade, food grade, and lemon-lime grade. The food grade comprises about 97% d-limonene, the untreated/technical grade about 95% d-limonene, and the lemon-line grade about 70% d-limonene, the balance in all being other terpene hydrocarbons and oxygenated compounds. The technical and food grades of limonene are the most preferred for use in this invention and require no additional purification to remove impurities or water.

Preferably, the sealants are emulsified or saponified.

Immediately after application or as a one-step process, sand shall be applied at approximately 1–2 pounds per square yard. This can be any locally available sand, preferably dry to facilitate an even application over asphalt pavement. The sand as part of this process will help to fill small voids in the surface of the payment, making for a water resistant surface. Excess sand may need to be broomed or vacuumed within 24 hours, depending on the location and population density. Immediately following the liquid and sand application, traffic may be permitted to resume as the pneumatic compaction of rubber tired vehicles will aid in the further compaction of the asphalt surface as well as the working and placement of the sand particles into the surface voids. Over a short period of time, within 24 hours, the agricultural sealant will soften the asphalt binder of the pavement allowing for this additional surface compaction and the filling and gluing of the sand into the surface voids.

The depth of penetration are variables dependent on (1) density, (2) age of pavement, (3) temperature of pavement, (4) temperature of agricultural sealant, (5) rate of liquid application, and (6) time from original placement of asphalt pavement. The extent of change within the surface asphalt binder will also be dependent on these same variables. ASTM D5–25 test for penetration of asphalt liquids shows the direct results of the agricultural sealant's ability to effect desired changes and allow for the further pneumatic compaction as well as the filling and gluing of sand particles into surface voids. A sample of asphalt pavement taken from a production facility before placement was tested using ASTM D-1856 asphalt recovery. This sample was then tested at three different application rates. The result of which are reported below:

ASTM D5-25 PENETRATION TESTS ON ASPHALT CEMENT

| | | | Penetration at 77° F. (.1 mm) | |
|---|---|---|---|---|
| Application Rate[1] | Affected Depth | Asphalt Cement (from refinery) | Mixed Asphalt Cement (2) | Rejuvenator Applied to Asphalt Cement[3] |
| .03 gal./s.y. | .375 | 54 | 31 | 96 |
| | .500 | 54 | 31 | 84 |
| .04 gal./s.y. | .375 | 54 | 31 | 108 |
| | .500 | 54 | 31 | 91 |
| .05 gal./s.y. | .375 | 54 | 31 | 125 |
| | .500 | 54 | 31 | 102 |
| .06 gal./s.y. | .375 | 54 | 31 | 148 |
| | .500 | 54 | 31 | 112 |

[1]Rates of application are all based on rejuvenator in a ready-to-use emulsified state with a 25%–35% concentration level of rejuvenator. The above tests were performed used rejuvenator emulsion at 29% residue or active agent.
[2]Asphalt recovery ASTM D-1856 used on mix sample prior to placement into paving equipment.
[3]Calculations were used to determine the precise amount of rejuvenator to thoroughly mix with the asphalt cement to test penetration value. The removal of top affected .375"/.500" for testing would not be practical in field application of rejuvenator.

As the above test shows, the penetration of the original asphalt from the refinery versus the asphalt liquid after the production and mixing process has shown a 43% loss in its penetration value. The test then shows the affected penetration value of the top ⅜ to ½ inch of asphalt pavement affected by the agricultural sealant process. Calculations save been used in determining the approximate rate of application with respect to the depths of penetration of the agricultural sealant in to the pavement surface. As shown above through the use of the ASTM D5–25, the treated versus mixed asphalt cement results show a 200% change in these values.

These raised penetration values directly correspond to the asphalt pavement's flexibility at the surface. This also relates directly to the increased amount of oxidation that must occur over a period of time that will be necessary to age it back to its original penetration value had it not been treated with agricultural sealant.

This agricultural sealant is a blend of light oils as well as other heavier oils, each performing a specific function of the process, some having an almost immediate action on the asphalt binder to allow the heavier oils to penetrate and become part of the binder and remain for longer periods of time. These heavy oils will retard the oxidation process and protect the underlying pavement through the compaction and sealing process that occurs with its use. The composition is intended for use on relatively new pavements (less than one year old). However, the percentages of light oil and heavy oils may be adjusted to allow for older pavements to be affected. Care should be taken in these older pavement application rates to prevent over-softening the asphalt binder.

Specifications for the agricultural sealant compositions of the invention are as follows:

SEALANT CONCENTRATE SPECIFICATIONS

| Test Method | Characteristic | Specifications | |
|---|---|---|---|
| ASTM D-1298 | Specific Gravity | | |
| ASTM D-95 | Water | 1% Max | |
| ASTM D-158 | Distillation Residue: | Temp °C. | Distillate |
| | | 170° C. | 0–40% |
| | | 270° C. | 0–5% |
| | | 300° C. | 0–5% |
| ASTM D-88 | Viscosity | 10–50 sec. @ 122° F. | |
| Flashpoint | | 110° F. | |
| Percent Volatile | | 5%–40% | |

The compound has a specific gravity at 25/25° C. of at least 0.863 with a weight per gallon of approximately 7.2 lbs., an initial boiling point of at least 110° F., and 50% of the material as a residue at 300° C.

In the following Examples, I used the following materials: (1) soybean oil; (2) methyl ester of soybean oil; (3) d-limonene and (4) turpentine.

| EXAMPLE 1 | | EXAMPLE 2 | | EXAMPLE 3 | |
|---|---|---|---|---|---|
| Compound | % | Compound | % | Compound | % |
| 1 | 60 | 1 | 40 | 1 | 20 |
| 2 | 20 | 2 | 40 | 2 | 60 |
| 3 | 20 | 3 | 0 | 3 | 10 |
| 4 | 0 | 4 | 20 | 4 | 10 |

Baseline established using asphalt binder after plant mixing at 320° F. through normal procedures and recovered by ASTM D-1856 with the recovered asphalt then tested for penetration by means of ASTM D5–25 and having an average result of 31 mm:

ASTM D5-25 AGED PENETRATION TESTS ON ASPHALT CEMENT

| | | Rejuvenator | Penetration at 77° F. (.1 mm) | |
|---|---|---|---|---|
| Application Rate[1] | Affected Depth | Applied to Asphalt Cement[2] | Aged Treated Asphalt Cement[3] | Aged Treated Asphalt Cement[4] |
| .03 gal./s.y. | .375 | 96 | 85 | 65 |
| | .500 | 84 | 71 | 57 |
| .04 gal./s.y. | .375 | 108 | 96 | 74 |
| | .500 | 91 | 81 | 68 |
| .05 gal./s.y. | .375 | 125 | 109 | 84 |
| | .500 | 102 | 93 | 81 |
| .06 gal./s.y. | .375 | 148 | 126 | 96 |
| | .500 | 112 | 101 | 86 |

[1]Rates of application are all based on rejuvenator in a ready-to-use emulsified state with a 25%–35% concentration level of rejuvenator. The above tests were performed used rejuvenator emulsion at 29% residue or active agent.
[2]Calculations were used to determine the precise amount of rejuvenator to thoroughly mix with the asphalt cement to test penetration value. The removal of top affected .375"/.500" for testing would not be practical in field application of rejuvenator.
[3]Treated specimens oven-aged 48 hours at 350° F.
[4]Treated specimens oven-aged 96 hours at 350° F.

Although the now preferred embodiments of the invention have been set forth, it will be apparent to those skilled in the art that various changes and modifications may be made thereto without departing from the spirit and scope of the invention as set forth in the following claims.

I claim:

1. An agricultural composition for preserving asphalt comprising a combination of soybean oil, alkyl esters of soybean oil, and at least one of d-limonene or other terpine hydrocarbons.

2. A sealant composition according to claim 1 wherein the combination comprises:

| Component | Weight Percent |
|---|---|
| soybean oil | 20.0 to 80.0 |
| alkyl esters of soybean oil | 10.0 to 60.0 |
| d-limonene | 10.0 to 40.0 |
| other terpine hydrocarbons | 0 to 40.0. |

3. A sealant composition according to claim 1 wherein the combination comprises:

| Component | Weight Percent |
|---|---|
| soybean oil | 20.0 to 60.0 |
| alkyl esters of soybean oil | 20.0 to 60.0 |
| d-limonene | 10.0 to 20.0 |
| other terpine hydrocarbons | 0 to 40.0. |

4. A sealant composition according to claim 1 wherein the combination comprises:

| Component | Weight Percent |
|---|---|
| soybean oil | 20.0 to 60.0 |
| alkyl esters of soybean oil | 20.0 to 60.0 |
| d-limonene | 10.0 to 20.0 |
| other terpine hydrocarbons | 0 to 20.0. |

5. A sealant composition according to claim 1 wherein the combination comprises:

| Component | Weight Percent |
|---|---|
| soybean oil | 20.0 to 40.0 |
| alkyl esters of soybean oil | 40.0 to 60.0 |
| d-limonene | 0 to 20.0 |
| other terpine hydrocarbons | 10.0 to 40.0. |

6. A sealant composition according to claim 1 wherein the combination comprises:

| Component | Weight Percent |
|---|---|
| soybean oil | 20.0 to 40.0 |
| alkyl esters of soybean oil | 40.0 to 60.0 |
| d-limonene | 10.0 to 20.0 |
| other terpine hydrocarbons | 10.0 to 20.0. |

7. A sealant composition according to claim 1 wherein the combination comprises:

| Component | Weight Percent |
|---|---|
| soybean oil | 60.0 |
| methyl ester of soybean oil | 20.0 |
| d-limonene | 20.0. |

8. A sealant composition according to claim 1 wherein the combination comprises:

| Component | Weight Percent |
|---|---|
| soybean oil | 40.0 |
| methyl ester of soybean oil | 40.0 |
| turpentine | 20.0. |

9. A sealant composition according to claim 1 wherein the combination comprises:

| Component | Weight Percent |
|---|---|
| soybean oil | 20.0 |
| methyl ester of soybean oil | 60.0 |
| d-limonene | 10.0 |
| turpentine | 10.0. |

10. A sealant composition according to claim 1 wherein the composition is emulsified.

11. A sealant composition according to claim 1 wherein the composition is saponified.

12. A sealing and rejuvenating composition for bituminous and concrete surfaces comprising the sealant composition of claim 1.

13. A method of stabilizing paving aggregate by treating a quantity of aggregate to be stabilized with 1 to 3 percent by weight, based on the weight of the aggregate, with the composition according to claim 1.

14. A method according to claim 13 wherein the sealant composition is an emulsified composition with a 25 to 35 weight percent concentration of the sealant composition based on the total weight of the emulsified composition.

15. A method according to claim 14 including the step of applying the emulsified composition to the aggregate at a rate of 0.03 to 0.15 gallon per square yard of the aggregate.

16. A method according to claim 15 including the step of applying sand to the treated aggregate at a rate of 1 to 2 pounds of the sand per square yard of the treated aggregate.

* * * * *